United States Patent Office 2,875,137
Patented Feb. 24, 1959

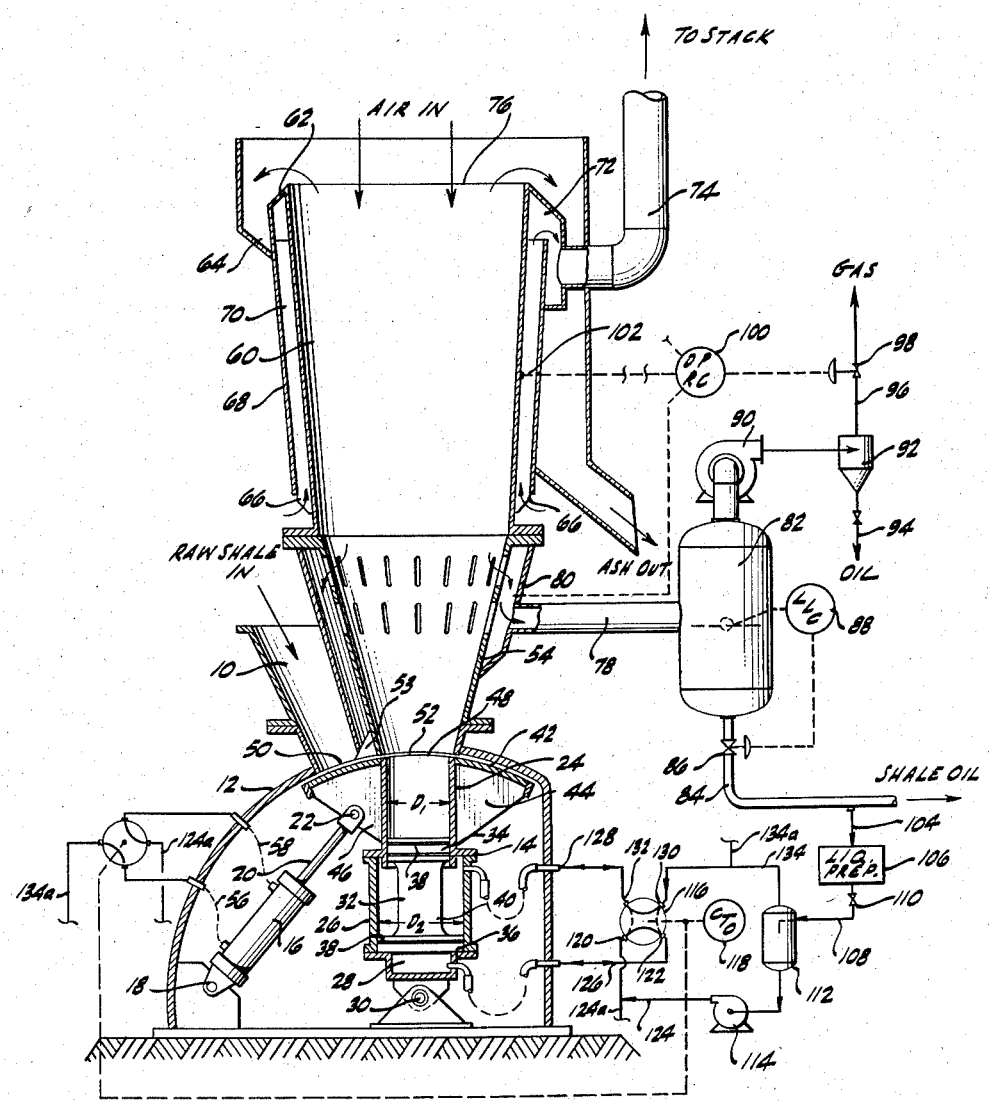

2,875,137

SOLIDS FEEDING PROCESS AND APPARATUS

William C. Lieffers, Santa Ana, and Robert L. Switzer, Long Beach, Calif., assignors to Union Oil Company of California, Los Angeles, Calif., a corporation of California Application October 24, 1955, Serial No. 542,284

5 Claims. (Cl. 202—6)

This invention relates to an improved process and apparatus for the handling of granular solids and in particular relates to an improved process and device for passing granular solid material upwardly through a contacting zone countercurrent to a downward flow of fluid. Specifically the present invention is directed to an improved countercurrent contacting process in which granular solid material is passed upwardly by means of a reciprocating piston feeder through a vertical contacting zone countercurrent to a downward passage of a heat treating fluid.

The present invention is specifically applicable as an improvement to those processes and apparatuses for countercurrent contacting of fluids and solids wherein granular solids are passed upwardly through the contacting zone by means of a mechanical feeder mechanism and a heat treating fluid is passed downwardly countercurrent thereto. Representative of these processes are operations in which bituminous coal is coked in the presence of a countercurrent gas flow to produce coal oils and tars and coke, processes in which coke is countercurrently contacted by steam and air to produce a mixture of carbon monoxide and hydrogen together with undecomposed water, processes in which oil shale is countercurrently contacted with hot gases such as flue gases generated by combustion of a carbonaceous deposit on the spent shale to produce shale ash and shale oil and gas, processes in which bituminous or tar sands are countercurrently contacted with flue gas to burn residual coke from the sand so as to generate high temperature flue gases to distill tar sand oils therefrom, and the like. The invention is also applicable to other processes than those mentioned and in which a liquid product is produced.

A particular improvement involves the use of a treated or untreated fraction of this liquid product as a means for effecting upward movement of the solid material to be treated from the reciprocating feeder through the contacting zone.

In the prior art there are several processes and apparatuses disclosed in which granular solids are passed upwardly through a contacting zone countercurrent to a downward flow of fluid and in which miscellaneous heat treating operations are carried out. One of these employs a pair of screw feeders disposed at right angles to each other, the first screw being horizontal and the second being disposed vertically in alignment with the contacting zone. It has been established that this device is characterized by its nature by a high solids attrition rate in which extensive grinding of the solids results in fines formation, an excessively high erosion of the screw and the screw casing in the presence of these abrasive materials and by an undesirably low mechanical deficiency. The physical size of such screw feeders required for transporting granular solid materials such as oil shale upwardly into the contacting zone at rates of the order of 1,000 tons per day is excessively great and the original capital cost is prohibitively high.

Other processes and apparatuses disclosed by the prior art have substituted reciprocating piston feeders in which the solid materials are forced upwardly through a cylinder by means of a piston into and through a contacting zone. Such pistons may be reciprocated along a vertical or horizontal axis. When the axis of reciprocation is horizontal then an elongated curved conduit is required in order to direct the solids upwardly. It has been shown that the length and the curvature of such a curving conduit grossly decreases the efficiency by increasing the force which is required at the piston in order to move the granular solids through the curved conduit and upwardly through the contacting zone. This in turn requires large increases in energy and operating pressures to effect solids flow and simultaneously solids attrition and mechanical erosion of the equipment are grossly increased.

With vertically reciprocating piston feeders, the piston is usually driven by means of a hydraulic cylinder. This cylinder frequently requires the application of very high hydraulic pressures of the order of several thousand pounds per square inch in order to lift the solids, the hydraulic fluid is expensive, and loss thereof constitutes an economic disadvantage. In most cases any hydraulic fluid loss accumulates with the liquid product produced from the system and constitutes a contaminant therein in addition. The fact that the solids feeder piston is driven by a hydraulic cylinder increases the height of the equipment unnecessarily. Also the equipment can fail due to failure of O rings and packing gland seals. These are very inaccessible inside the case. The environment is not conducive to prolonged life of mechanical equipment.

In addition, the reciprocation of the upper or solids feeding piston causes liquid surging within the solids feeder case caused by displacement of the piston with respect to the feeder case. In commercial size equipment with multi-feeders, this surging becomes very excessive. The instantaneous requirement of oil for the feeder case is very great and would either produce a great surge of oil out into the product receiver or conversely require a large quantity of oil quickly. This could rob the sealing system of oil thus causing the oil seal to be lost at the feed inlet hopper. Air would then enter the retort at this point bypassing the retort proper and possibly causing a hazardous explosive gas mixture. At the least, retorting and burning efficiencies would be severely reduced. Mechanical innovations to overcome this problem require considerable instrumentation and extra equipment of large size.

The present invention is directed to a solids fluid contacting process in which the solid material is fed upwardly through the contacting zone by a novel process and apparatus and which avoids all of the aforementioned disadvantages characteristic of the prior art.

It is a primary object of the present invention to provide an improved solids-fluid contacting process.

It is more specifically an object of this invention to provide an improved method for feeding solid materials upwardly through a contacting zone.

It is a specific object of this invention to provide in solids-fluid contacting processes which produce a liquid product, a solids feeding method which employs a part of the liquid product as a means for feeding the solid materials into the contacting zone.

It is a more specific object of this invention to provide in shale and tar sand retorting processes an improved system utilizing a vertically reciprocating piston feeder which is actuated by a portion of the shale ore oil or tar sand oil produced in the process and which eliminates the major portion of the oil surges.

It is also an object of the present invention to provide an improved apparatus for effecting the aforementioned objects.

Other objects and advantages of the present invention will become apparent to those skilled in the art as the description and illustration thereof proceed.

Briefly the present invention comprises an improved process and apparatus for contacting fluids and particulate solids countercurrently in a system in which the solid material is passed upwardly as a dense fluid-permeable moving bed by means of a special solids feeder mechanism through a heat treating or contacting zone while the fluids pass downwardly through the permeable solids bed and are disengaged from the contacting zone at a point just above the solids feeder outlet. The process is specifically applicable in the eduction of tar oil from tar sands or shale oil from oil shales and the like, but the process is also generally applicable to operations involving countercurrent solids-fluid contact in which a liquid product is produced as a result thereof. The following description is in terms of oil shale eduction as an example only and is not to be construed as a limitation of the invention.

In the process of this invention the oil shale is received from storage through a hopper zone through which it passes by gravity into a vertically acting piston feeder. The cylinder containing the raw shale oscillates from alignment with the hopper into alignment with the vertical solids-fluid contacting zone into which the shale is expelled. These solids and those above are displaced by additional raw shale upwardly successively through a perforate solids-fluid disengaging zone, a shale preheating zone, a shale oil eduction zone, a spent shale burning zone, and a burnt shale cooling zone from which it is expelled for disposal.

By means of a blower, which takes suction on the perforate disengaging zone or by means of a forced draft of gas entering the top of the solids-fluid contacting zone, the fluid is passed downwardly countercurrent to the shale in reverse order through the aforementioned zones so that the gases are first heated by direct heat exchange in the burnt shale cooling zone, then react with a burning carbonaceous material from the spent shale in the combustion zone forming heated eduction gases which contact the shale in the eduction zone to expel the fluid products therefrom in liquid or vapor form. The mixture thus formed is cooled and at least partly condensed by direct contact with the raw shale in the solids preheating zone, the liquid condensate flows downwardly and fills the solids feeder case and the bottom part of the disengaging zone, and then the fluids so produced are disengaged in the perforate disengaging zone and removed therefrom. The fluid mixture comprises liquid and vapor educted products together with combustion gases and these are discharged into a vapor liquid separating zone from which they are separately removed. The gas fraction may be further treated to recover valuable products therefrom, or recycled in part to the contacting zone, or utilized as fuel. The liquid shale oil product is subsequently further treated or sent to storage or the like. In the present invention at least part of this liquid product is purified if necessary or fractionated if desired and returned to the solids feeding zone under pressure as a medium for causing the upward solids movement through the fluid solids contacting zone.

The solids feeder cylinder referred to above is disposed in a vertical position with heavy support trunnions at its lower end. This permits the cylinder to oscillate in a vertical plane between extreme positions of alignment with the raw shale hopper and alignment with the contacting zone. In the present invention the shale feeder piston comprises a pair of coaxially aligned serially connected cylindrical sections of different diameters and provided therein with a floating or double-ended piston. The upper section has a diameter only slightly smaller than the lower or larger section. Large differences can be used but some difference must exist. One end of the double-ended piston is disposed in each of these cylindrical sections and integrally connected to each other by means of a connecting rod or the like. By having two large diameter pistons connected, the guiding action is very good and the feed piston is not misaligned due to uneven pressures at the rod piston interface.

The hydraulic fluid which activates this piston feeder comprises a fraction of the liquid product of the process. Part of this liquid product is removed from the separator, is filtered if desired and is cooled if necessary, and added to the hydraulic system employed to reciprocate the piston feeder. This part of the liquid product may be distilled or otherwise chemically treated if desired to provide it with special properties and ordinarily the amount required in actual operation is relatively small since addition is required only to compensate for leakage from the hydraulic to the process systems. Thus, none of the fluid is actually lost. This liquid is used to charge the piston feeder and the oscillating cylinder hydraulic system and to supply makeup liquid for it.

A second or oscillating cylinder is connected to the feeder cylinder and activated so as to oscillate the feeder cylinder between the positions described. In a similar fashion, this oscillating cylinder can be constructed and utilized to be actuated by the same actuating fluid as the feeder piston, that is an oil from the process under consideration. The oscillating piston can be actuated by a purified or distilled fluid above, at the same, or below the main feeder fluid pressure. Advantages of this are similar, in that contamination is avoided as well as expensive losses.

By so employing a part of the liquid product as the hydraulic fluid to actuate the floating or double-ended solids feeder piston and the oscillating cylinder, highly advantageous improvements in solids transport in such contacting processes are readily obtained. The loss of expensive hydraulic fluid is completely avoided, the contamination of liquid product with such fluids is thereby avoided, the maximum pressure at which the hydraulic fluid must be supplied to the piston feeder is materially reduced and approaches the rock-piston interface pressure, and an exceedingly simple system for returning the double-ended piston from the delivery to the receiving position is realized.

If very large piston diameters are used, similarly large actuating or lower piston diameters are also used. If conventional fluid were used severe loss could be obtained through leakage around the piston periphery. Piston rings or other sealing devices would have to be used and these could not be made to prevent leakage. As wear progresses during operation, the leakage increases greatly. Thus such a system could not be used with regular hydraulic fluid since loss and contamination would be intolerably high. The outward leakage of oil across the rings tends to keep them clean and free of dirt thus reducing wear.

The actual structure of the apparatus of this invention and the processes in which it can be employed will be more readily understood by reference to the accompanying drawing which combines an elevation view in partial cross section of the structure of this invention and a schematic flow diagram of the hydraulic system by means of which the solids are removed upwardly therethrough.

Referring now more particularly to the drawing, the description thereof which follows is intended as an example of one specific process to which the process of this invention is applicable and is not intended as a limitation thereof as it is readily apparent to those skilled in the art that the process has general utility in countercurrent fluid-solids contacting processes in which the solids are passed upwardly and the fluids passed downwardly through a contacting zone to produce a liquid product.

The process of this invention briefly described above is applied to the retorting of oil shale obtained from the State of Colorado. This oil shale is capable of producing (Fisher Assay) 28 U. S. gallons of shale oil per ton. The shale is mined and crushed to sizes ranging normally from 0.5 inch to about 6 inches. The raw shale is fed at the rate of about 35 tons per day into the apparatus shown in the drawing. The shale is introduced into hopper 10 through which it flows by gravity as a downwardly moving bed into the top of piston feeder casing 12. This casing is provided with flat sides and a curving top. Disposed within the case is piston feeder 14 and oscillating cylinder 16. The oscillating cylinder is anchored at 18 to the feeder case and connected by means of piston rod 20 to pivot 22 which in turn is connected to the piston feeder.

The piston feeder comprises an upper cylindrical section 24 of lesser diameter $D_1$, an intermediate cylindrical section 26 having a larger diameter $D_2$, and a lower cylindrical section 28. The bottom of the feeder cylinder is supported at trunnion 30 against the bottom of feeder case 12.

Disposed within the solids feeder cylinder is a floating or double-ended piston 32 consisting of an upper or driven piston 34 having a diameter $D_1$ and a lower or driving piston 36 having a slightly larger diameter $D_2$. Each of these pistons is preferably provided with one or more piston rings 38 to prevent or minimize hydraulic fluid leakage. The pistons are integrally connected to each other by means of connecting rod 40 in the manner shown.

The upper extremity of the upper cylindrical section is integrally connected to and opens through a curving member or guard 42. This element has a width which is approximately three times the diameter of the lower outlet of the contacting zone and is supported by means of webs 44 and 46 to the walls of upper cylinder 24 to prevent rock from falling down into case 12.

It is now readily apparent that upon reciprocation of hydraulic cylinder 16, the feeder cylinder will oscillate in a vertical plane about trunnion 30 bringing the mouth 48 of the feeder cylinder alternately into alignment with the lower outlet 50 of hopper 10 and the lower inlet opening 52 of the perforate conical disengaging section 54 as shown.

Oscillating cylinder 16 is provided with connections 56 and 58 through which hydraulic fluid is introduced and removed to effect the oscillation of the feeder cylinder described.

The operating cycle is briefly as follows. With the oscillating cylinder and the piston feeder in the position shown the feeder piston is raised forcing a volume of raw shale upwardly into perforate disengaging section 54 which further displaces the solids already in the equipment to higher positions. With the feeder piston in its uppermost position oscillating cylinder 16 is retracted bringing the feeder cylinder into alignment with hopper 10. The solids feeder piston is then retracted causing the introduction of a new charge of raw shale. Oscillating cylinder 16 is then extended to realign the feeder cylinder with the lower inlet 52 of disengaging zone 54, as shown. A plurality of triangular shaped projections 53 remove excess shale from the charge to prevent jamming the feeder cylinder during this step. The feeder piston is then raised forcing an additional charge of raw shale upwardly through the equipment. This cycle is repeated so as to effect a substantially continuous upward flow of solids at a frequency sufficient to introduce the shale at the desired rate.

The solids pass under the influence of the feeding mechanism just described upwardly successively through conical disengaging chamber 54 and conical heat treating section 60. The spent solids are discharged over cowling 62 by means of a rotating plow or scraper mechanism not shown and fall into ash chute 64 from which they are removed by gravity for disposal. Heat treating section 60 is provided with a plurality of longitudinal radial fins 66 at its outer surface. These are surrounded by jacket 68 forming a natural convection cooling zone 70 through which air passes upwardly into heater 72. The warm air is removed therefrom by means of conduit 74 and is discharged as shown to a stack. If desired a forced draft may be employed. Also a part of this preheated air may be returned to the upper inlet opening 76 of heat treating section 60.

Outlet conduit 78 opens from jacket 80 which in turn surrounds conical disengaging section 54. Conduit 78 opens into vapor-liquid separator vessel 82 in which the gases and condensed fractions of the product are separated. The liquid products are removed therefrom through line 84 at a rate controlled by valve 86 actuated by liquid level controller 88. Gas blower 90 removes the gaseous fraction and introduces it into cyclone 92 in which additional quantities of oil are agglomerated from mists present in the gaseous phase. This additional oil is removed through line 94 and the gaseous fraction passes through line 96 at a rate controlled by valve 98 as actuated by differential pressure recorder controller 100 connected across the shale bed so as to be actuated by the difference between the pressure at the perforated conical disengaging section 54 and the atmospheric pressure at the top of treating section 60. Optionally a temperature controller actuated by thermocouple point 102 which detects the position of the burning zone within heat treating section 60 may be used instead to maintain the burning zone substantially stationary by varying the rate of gas flow downwardly therethrough.

As indicated briefly above, a portion of the liquid product is removed from outlet line 84 and is passed through line 104 to liquid preparation zone 106. Herein the shale oil or other liquid product of the process is subjected to any appropriate pretreatment to adapt it for use in the solids feeder system described above. This liquid stream is filtered to remove any traces of fine solids or solidified portions of the product such as paraffin wax, asphalts, and the like. If desired it may be distilled to separate a medium or high boiling fraction and if possible it is desirable to separate such a fraction having lubricating qualities. In any event, the prepared liquid passes from pretreatment or preparation zone 106 through line 108 controlled by valve 110 at a rate sufficient to make up liquid leakage upwardly around the feeder piston. This liquid is introduced into reservoir 112 from which it is pumped by means of pump 114 into feeder control valve 116 which is actuated by cycle timer operator 118.

When feeder piston 32 is in the position shown, valve 116 is connected in the position indicated so as to connect ports 120 and 122 so that high pressure oil flows through line 124 into the bottom of the feeder cylinder through line 126. This causes feeder piston 32 to rise forcing a charge of shale rock upwardly into the apparatus and at the same time the oil present in intermediate cylinder 26 is displaced through line 128 through ports 130 and 132 and on through line 134 to reservoir 112. Suitable restriction or control is placed in line 128 or 134 to maintain the hydraulic oil pressure in the intermediate chamber always higher than the oil pressure above the piston. This is also done in lines 126 or 124 on the return so that leakage across the piston rings is always outward into chambers 24 or 28. The feeder cylinder is then oscillated into alignment with hopper 10, cycle timer operator 118 then rotates control valve 116 so that ports 120 and 132 and ports 122 and 130 are connected as indicated by the broken lines. This supplies high pressure oil through lines 124 and 128 to intermediate cylinder 26. Because lower piston 36 has a somewhat larger diameter and therefore a larger area than does upper piston 34, a net downward force insures the positive return of feeder piston 32 to the lower position shown in the drawing whereby a fresh charge of shale rock is introduced into the upper cylinder 24. With this downward motion of the feeder piston 32, low pressure oil is returned through lines 126 and 134 to reservoir 112. The cycle is repeated as described previously to effect a substantially constant upward introduction of solids.

In the specific example above described the upper feeder cylinder 24 has a diameter of 12 inches and a vertical stroke of 12 inches. Upper piston 34 thus has a diameter of substantially 12 inches and the lower piston 36 has a diameter of 14 inches. Thus the area of the lower piston is 36% greater than the upper piston permitting a positive return to the bottom of the feeder cylinder.

In the persent apparatus kiln section 60 has an upper diameter of 60 inches, a lower diameter of 48 inches and a vertical height of 84 inches. The perforate conical disengaging section has an upper diameter of 48 inches, a lower diameter of about 13 inches, and a vertical height of about 48 inches. In the same structure prior to installation of the improved solids feeder apparatus above described, the upper piston was reciprocated by means of a separate hydraulic cylinder similar to cylinder 16 employed herein to oscillate the improved solids feeder in the vertical plane described. With Colorado shale rock feed at a rate of about 35 tons per day, the hydraulic fluid pressure employed varied between about 1,500 and 3,500 p. s. i. during the feeding stroke when the shale was being introduced upwardly into and through the equipment.

With the present device having the same diameter of upper piston 34 and the same stroke of 12 inches but with the improved floating or double-ended piston structure shown in the attached drawing, the fluid pressure during the upstroke is found to be 190 p. s. i. There was no noticeable surging of oil present within the feeder case because the solids feeder cylinders do not communicate therewith. No product contamination or serious economic loss was encountered due to leakage of the prepared shale oil upwardly from the hydraulic system into the disengaging zone. Make up quantities of treated shale oil average about 100 gallons per day in the system in which the treated shale oil was circulated in the hydraulic system at a rate of 5,000 gallons per day to effect the 35 tons per day shale feed rate. It must be understood that none of the 100 gallons make up is actually lost, it merely leaks upwardly around the upper piston and combines with the liquid product from which it was derived.

Some leakage of shale oil from the hydraulic system around pistons 34 and 36 is desirable for lubrication purposes. This flow however is very substantially reduced to non excessive values during the upstroke because there are effectively two pistons in series past which this leakage must occur. Even in this respect it is not actually lost since it merely displaces raw product liquid from the solids feeder case 12 upwardly through the clearances between the top of upper feeder cylinder 24 and the bottom of disengaging section 54 and is removed with the liquid product. This clean filtered oil leaking past the upper and lower pistons effectively maintains the piston rings and cylinder surfaces in contact with a clean dirt-free shale oil only and prevents build-up of dirt and sludge within the hydraulic chambers or cylinders in the feeder mechanism and reduces wear and maintenance. The upward flow previously mentioned is further reduced by the fact that the liquid pressures existing within the cylinders during the upstroke are reduced to very small percentage of those formerly required.

It should be understood that although the present invention has been described and illustrated primarily in conjunction with a process and apparatus for treating shale rock to produce shale oil, it is also applicable in general to processes wherein moving solid material is countercurrently contacted with a treating fluid to produce a liquid product and various illustrations of such other processes have been given previously. It is thus clear that the present invention is not intended to be limited only to a process and apparatus for the production of shale oil from oil shale.

A particular embodiment of the present invention has been hereinabove described in considerable detail by way of illustration. It should be understood that various other modifications and adaptations thereof may be made by those skilled in this particular art without departing from the spirit and scope of the invention as set forth in the appended claims.

We claim:

1. In a process wherein solids are moved upwardly and successively through a disengaging zone and a contacting zone countercurrent to a descending treating fluid which educts from said solids in said contacting zone a product which condenses and separates in said disengaging zone as a liquid which is withdrawn therefrom as a process product, the said movement of said solids being effected by means of a solids feeder piston which is caused to reciprocate within a vertical solids feeder cylinder, the improvement which consists in separating a portion of said process liquid, treating said portion to adapt it to use as a hydraulic fluid, introducing said treated liquid into said cylinder below said piston under sufficient pressure to force said piston and said solids upwardly, and allowing a portion of said treated liquid to pass upwardly through the space between said piston and said cylinder to lubricate said piston and to purge solids fines from said space.

2. A process in accordance with claim 1 wherein the said solids comprise raw oil shale, the said treating fluid is air, the said process liquid is shale oil, and the said treating step comprises filtration.

3. An apparatus for countercurrently contacting solids and fluids which comprises a solids-feeder assembly comprising a vertically disposed pressure cylinder closed at its lower end, an open-ended feeder cylinder of smaller diameter than said pressure cylinder and integrally attached to the open end thereof, and a double-headed piston having its upper head reciprocably disposed within said feeder piston and its lower head reciprocably disposed within said pressure cylinder; means for supporting said solids-feeder assembly at its lower end while allowing it to pivot in a vertical plane, a feeder case enclosing said solids-feeder assembly and said supporting means, said feeder case having a solids inlet port and a solids discharge port in the upper surface thereof; means disposed within said feeder case for oscillating the upper end of said solids feeder assembly between alignment with said inlet port and said discharge port; a solids-liquid disengaging chamber superimposed on said feeder case and in communication with said discharge port; a solids-fluid contacting chamber superimposed on and in communication with said disengaging chamber; means for passing a fluid downwardly through said contacting chamber and said disengaging chamber in succession; means for removing spent solids from the top of said contacting chamber; a vapor-liquid separator chamber communicating with said disengaging chamber, said vapor-liquid separator having an upper gas outlet and a lower liquid outlet; means for separating a portion of the liquid product which, during operation of the apparatus, flows from said lower liquid outlet; means for pumping said portion of liquid under pressure into said pressure cylinder and alternately to the space therein below said lower piston head, whereby said piston is forced upwardly, and to the space therein between said upper piston head and said lower piston head, whereby said piston is forced downwardly; means for coordinating the said movements of said piston with the aforesaid movements of said hydraulic cylinder so that said piston is forced downwardly when said solids feeder assembly is aligned with said solids inlet port and said piston is forced upwardly when said solids feeder assembly is aligned with said solids discharge port; and means on said upper piston head to allow a small amount of said liquid to pass upwardly between said upper piston head and said feeder cylinder.

4. An apparatus as defined by claim 3 in combination with distillation means interposed between said means for separating a portion of said liquid product and said pumping means, and means for passing the overhead distillate stream from said distillation means to said pumping means.

5. An apparatus as defined by claim 3 in combination with means for pumping part of said portion of liquid product under pressure to said hydraulic cylinder.

References Cited in the file of this patent

UNITED STATES PATENTS

| | | |
|---|---|---|
| 1,926,692 | Tar Box | Sept. 12, 1933 |
| 1,962,459 | Ostlund | June 12, 1934 |
| 2,408,945 | Mohr, et al. | Oct. 8, 1946 |
| 2,566,633 | Rathmann | Sept. 4, 1951 |
| 2,627,455 | Berg | Feb. 3, 1953 |
| 2,640,014 | Berg | May 26, 1953 |
| 2,640,019 | Berg | May 26, 1953 |
| 2,694,039 | Wilson | Nov. 9, 1954 |

FOREIGN PATENTS

| | | |
|---|---|---|
| 965,866 | France | Feb. 22, 1950 |